US012624767B2

(12) United States Patent
Meeuwsen

(10) Patent No.: US 12,624,767 B2
(45) Date of Patent: May 12, 2026

(54) CHECK VALVE, AND ASSOCIATED SYSTEMS AND METHODS

(71) Applicant: Space Valves LLC, Puyallup, WA (US)

(72) Inventor: Kyle Jeffrey Meeuwsen, Puyallup, WA (US)

(73) Assignee: Space Valves LLC, Puyallup, WA (US)

( * ) Notice: Subject to any disclaimer, the term of this patent is extended or adjusted under 35 U.S.C. 154(b) by 0 days.

(21) Appl. No.: 18/638,829

(22) Filed: Apr. 18, 2024

(65) Prior Publication Data

US 2024/0353015 A1     Oct. 24, 2024

Related U.S. Application Data

(60) Provisional application No. 63/460,897, filed on Apr. 21, 2023.

(51) Int. Cl.
F16K 15/06     (2006.01)
(52) U.S. Cl.
CPC ................................. F16K 15/063 (2013.01)
(58) Field of Classification Search
CPC ...................................................... F16K 15/063
See application file for complete search history.

(56) References Cited

U.S. PATENT DOCUMENTS

| | | | | |
|---|---|---|---|---|
| 2,371,793 A | * | 3/1945 | Bourland | ............... G05D 13/10 |
| | | | | 137/556.6 |
| 6,415,815 B1 | * | 7/2002 | Blann | ................... F16K 17/048 |
| | | | | 137/494 |
| 7,216,668 B1 | * | 5/2007 | Adams | .................... F16K 17/32 |
| | | | | 137/462 |
| 2019/0257432 A1 | * | 8/2019 | Nabei | ................... F16K 25/005 |
| 2020/0300380 A1 | * | 9/2020 | John | .................... F16K 31/465 |
| 2020/0300383 A1 | * | 9/2020 | Doi | ........................... F16K 1/54 |

* cited by examiner

*Primary Examiner* — Patrick C Williams
(74) *Attorney, Agent, or Firm* — Dority & Manning, P.A.

(57)     ABSTRACT

A check valve assembly can include a housing including an inlet port, an outlet port, and a flow chamber defined by the housing and fluidly coupling the inlet port to the outlet port, an actuation chamber, and a piston assembly movable between a closed position and an open position. The piston assembly can include a poppet positioned in the flow chamber and can be configured to sealingly engage the housing in the closed position to fluidly separate the inlet port from the outlet port, and a flange positioned in the actuation chamber. The flange can contain a sealing member positioned between the flange and the housing to fluidly separate a forward actuation chamber from a rearward actuation chamber. A shaft can extend between the poppet and the flange. A biasing member can be operably coupled to the piston assembly wherein the biasing member biases the poppet assembly closed.

21 Claims, 4 Drawing Sheets

CHECK VALVE, AND ASSOCIATED SYSTEMS AND METHODS

CROSS-REFERENCE TO RELATED APPLICATION

This application claims priority to U.S. Provisional Application No. 63/460,897, entitled "PILOTED CHECK VALVE AND ASSOCIATED SYSTEMS AND METHODS," filed on Apr. 21, 2023. The entire contents of the above-referenced application are hereby incorporated by reference in its entirety for all purposes.

FIELD

The present disclosure relates generally to check valve assemblies for regulating the flow of an operating fluid, such as a liquid or gas, and more particularly, to a method and apparatus for metering the flow of a liquid or gas within a check valve in a way that reduces wear on the valve.

BACKGROUND

A check valve allows a fluid, such as a gas, liquid, or mixture of the two, to flow in a single direction while prohibiting flow in the other. Flow opposite of the intended direction is referred to as flow in the backward direction or "backflow". Check valves come in various forms, including ball, swing, and poppet-style check valve designs. Typically, check valves are biased to a closed position by a spring or hinge and permit flow in the intended, or forward direction when pressure at the inlet exceeds the valve's combined spring force and outlet pressure. This is referred to as the valve's "cracking pressure". Under certain flow conditions, the forward and rearward pressures can interact to cause the valve to rapidly open and close ("chatter"). Such chatter can damage the check valve by, for example, prematurely wearing the internal components of the valve, such as the poppet, spring, valve seat, etc.

Piloted valves use the force of compressed gas or other fluid acting on the wetted area of a piston or diaphragm to shift the valve into an actuated position, which typically results in a piloted valve's main flow chamber to alternate to either a non-flowing state or to a flowing state.

A metering orifice is a device that creates a flow impediment, which permits a specific flow rate of gas, liquid, or mixture of the two when subject to specific flow conditions. Accordingly, a piloted valve incorporating a metering orifice would be welcome in the technology.

BRIEF DESCRIPTION

Aspects and advantages of the technology will be set forth in part in the following description, or may be obvious from the description, or may be learned through practice of the technology.

In some aspects, the present subject matter is directed to a check valve assembly that includes a housing defining an inlet port, an outlet port, a flow chamber fluidly coupling the inlet port to the outlet port, and an actuation chamber positioned downstream of the flow chamber. A piston assembly is movable between a closed position and an open position. The piston assembly includes a poppet positioned in the flow chamber and configured to sealingly engage the housing in the closed position to fluidly separate the inlet port from the outlet port, a flange positioned in the actuation chamber, and a shaft extending between the poppet and the flange. A sealing member is positioned between the flange and the housing to fluidly separate a forward actuation chamber defined by the housing and the flange from a rearward actuation chamber defined by the housing and the flange. A biasing member is operably coupled to the piston assembly. The biasing member is configured to bias the piston assembly to the closed position.

In some aspects, the present subject matter is directed to a check valve assembly that includes a housing defining an inlet port, an outlet port, a flow chamber fluidly coupling the inlet port to the outlet port, an actuation chamber, an inlet channel, an outlet channel, and an internal flow impediment. A piston assembly is positioned within the housing. The piston assembly is movable between a closed position that is configured to fluidly separate the inlet port from the outlet port and an open position that is configured to permit an operating fluid to flow through the flow chamber from the inlet port to the outlet port. The piston assembly includes a poppet within the flow chamber and a flange positioned in the actuation chamber. A biasing member operably is coupled to the piston assembly and is configured to bias the piston assembly to the closed position.

In some aspects, the present subject matter is directed to a method for operating a check valve that includes receiving an operating fluid within a housing. The housing defines an inlet port, an outlet port, a flow chamber fluidly coupling the inlet port to the outlet port. The method also includes positioning a poppet within the housing in a closed position. The poppet seals the flow chamber to fluidly separate the inlet port from the outlet port in the closed position. The method further includes moving the poppet to an open position. The operating fluid flows through the flow chamber from the inlet port to the outlet port in the open position. Lastly, the method includes receiving an actuation fluid in at least one of a forward actuation chamber or a rearward actuation chamber to bias a flange operably coupled with the poppet.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
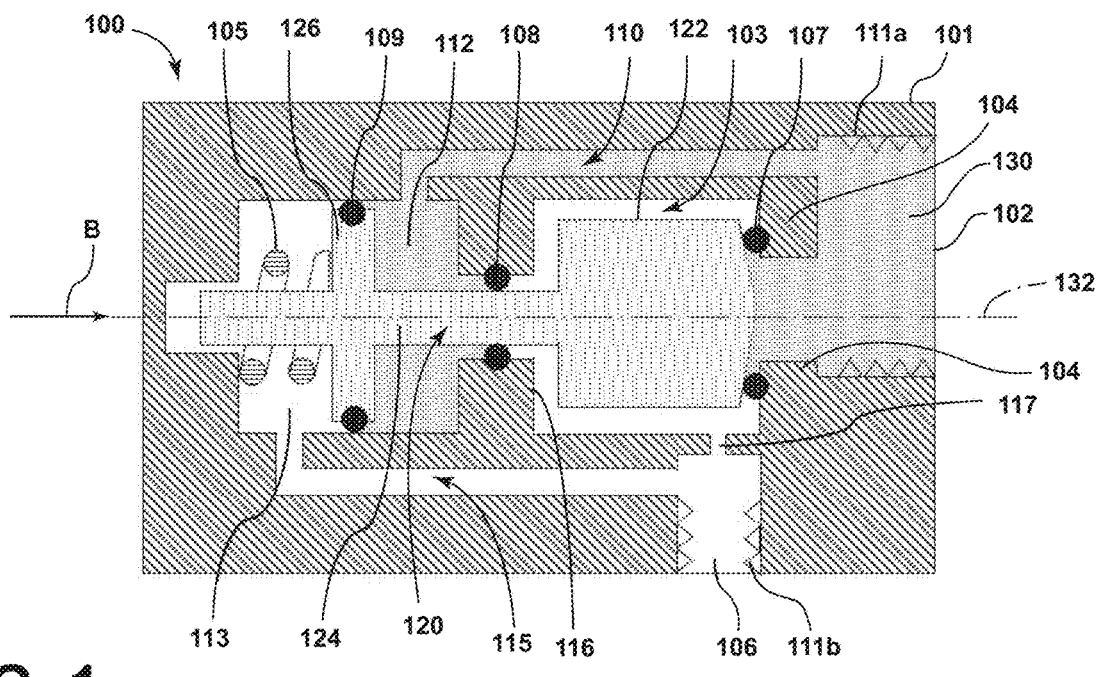
FIG. 1 illustrates a side cross-sectional view of a representative check valve assembly in a closed position in accordance with embodiments of the present technology.

Repeat use of reference characters in the present specification and drawings is intended to represent the same or analogous features or elements of the present technology.

DETAILED DESCRIPTION

Certain details are set forth in the following description and FIGS. 1-7 to provide a thorough understanding of various embodiments of the present technology. In other instances, well-known structures, materials, operations, and/or systems often associated with check valves, fluid control devices, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a harvested material within a fluid circuit. For example, "upstream" refers to the direction from which a signal flows, and "downstream" refers to the direction to which the signal moves.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the disclosed functionality, and any two components capable of being so associated can also be viewed as being "operably couplable" to each other to achieve the disclosed functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

As used herein, the term "sealingly disengage" includes a poppet position in which the poppet and any mating components are separated to allow flow from one portion of the check valve assembly to another portion of the check valve assembly. Such instances may be referred to as an "open" position for the check valve assembly. Conversely, the term "sealingly engage" includes a poppet position in which the poppet and any mating components prevent, inhibit, or otherwise restrict flow from one portion of the check valve assembly to another portion of the check valve assembly. Such instances may be referred to as a "closed" position for the check valve assembly.

In general, the present subject matter is directed to a check valve that offers a reduced severity of internal component wear by incorporating an actuation chamber into the check valve assembly. The check valve can regulate the flow of an operating fluid, such as a liquid, gaseous fuel, and/or a mixture of the two.

In some cases, the check valve can include a housing and a piston assembly movably positioned within the housing. For instance, the housing can include/define an inlet port configured to receive a flow of the operating fluid, an outlet port, a flow chamber fluidly coupling the inlet port to the outlet port, and an actuation chamber housing that is either fluidly connected or separated from the inlet port and outlet port. The housing can additionally or alternatively include/define a flow metering orifice. The actuation chamber can operate using the operating fluid, or in other examples can operate using some other fluid such as a hydraulic fluid, oil or lubricant, or another suitable fluid. The piston assembly can include a poppet positioned in a flow chamber, a flange positioned in the actuation chamber, and a shaft extending between and coupling the poppet and the flange. In operation, the piston assembly is movable between a closed position and an open position. In the closed position, the poppet sealingly engages the housing to inhibit the operating fluid from flowing between the inlet port to the outlet port through the flow chamber. In the open position, the poppet disengage the housing and allows the operating fluid to flow from the inlet port to the outlet port.

In some examples, the check valve assembly can further include/define a forward actuation chamber port and a rearward actuation chamber port that are fluidly decoupled from the inlet and outlet port. In some instances, the forward actuation chamber port and/or the rearward actuation can receive pressure and open the valve before the inlet port experiences an increase in pressure (e.g., the increase may be of a sufficient pressure). This configuration allows the piston assembly to be actuated open prior to the presence of sufficient pressure of the operating fluid at the inlet port to open the valve. Advantages of this configuration include the ability to open the valve prior to a high-pressure transient wave reaching the check valve assembly's inlet port. Opening the valve prior to a high-pressure transient wave can inhibit or even prevent the piston assembly from forcefully impacting the internal components of the check valve assembly in a manner that may damage these components. In contrast, a high-pressure transient wave will accelerate the poppet of a conventional check valve to a high velocity before the poppet impacts the check valve housing in the open position which may damage internal components.

In another aspect of the present technology, the housing of the check valve assembly can further include a second sealing member to inhibit the operating fluid from flowing from the flow chamber into the actuation chamber and/or from the actuation chamber into the flow chamber. A third sealing member can be configured to inhibit the operating fluid from flowing between the forward actuation chamber and the rearward actuation chamber. For example, the second sealing member can be positioned between the shaft of the piston assembly and the housing and the third sealing member can be positioned between the flange and the housing.

Figure 2:
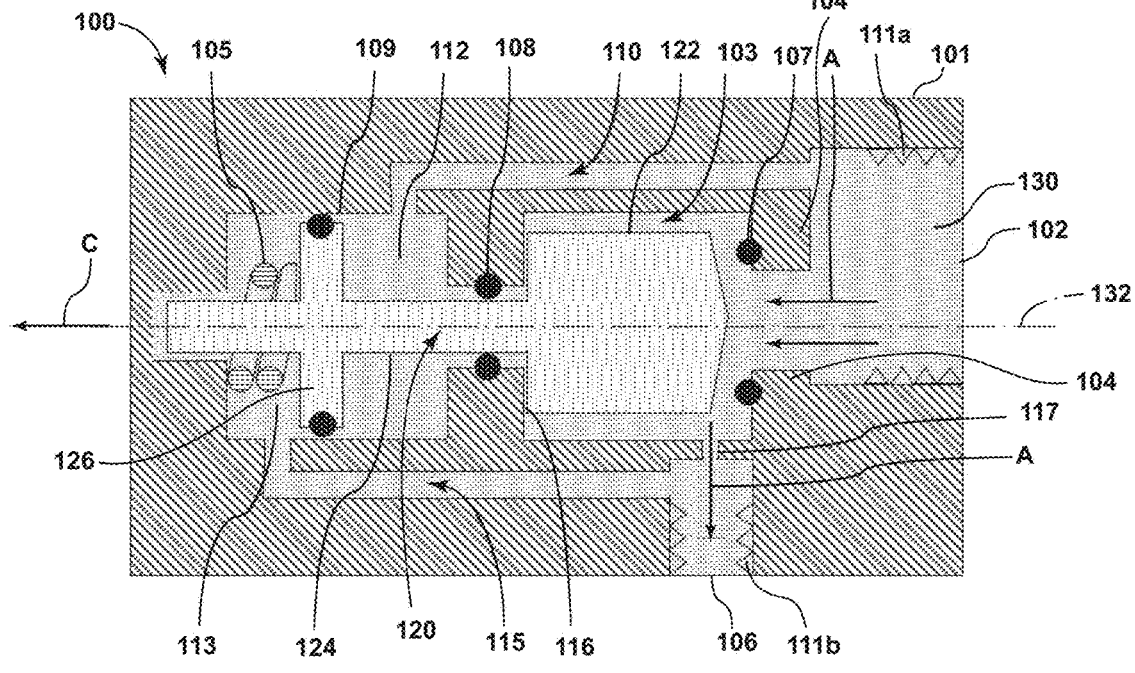
FIG. 2 illustrates a side cross-sectional view of the check valve assembly of FIG. 1 in an open position in accordance with embodiments of the present technology.
Figure 3:
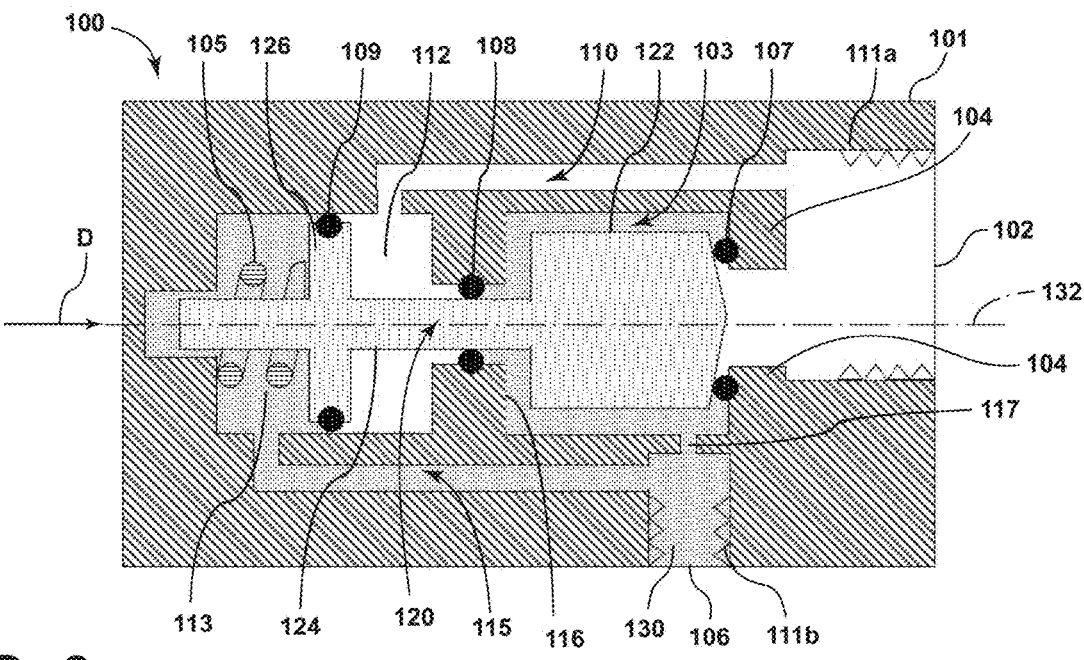
FIG. 3 illustrates a side cross-sectional view of the check valve assembly of FIG. 1 during pressurized backflow in accordance with embodiments of the present technology.

Referring now to FIGS. 1-3, side cross-sectional views of a check valve assembly 100 are illustrated in accordance with embodiments of the present technology. The check valve assembly 100 is illustrated in a closed position/configuration in FIG. 1, an open position/configuration in FIG. 2, and a configuration in which the check valve is sealed against a pressurized backflow in the closed position/configuration in FIG. 3. Referring to FIGS. 1-3 together, the check valve assembly 100 can include a housing 101 and a piston assembly 120 movably positioned within the housing 101. The various components of the check valve assembly 100 can be formed from metal, plastic, composite materials, and/or other suitably strong materials. Similarly, the components of the check valve assembly 100 can be manufactured via a molding process, three-dimensional printing process, and/or another suitable manufacturing process.

As illustrated in FIGS. 1-3, the housing 101 can define and/or include an inlet port 102 configured to receive a flow of an operating fluid 130, an outlet port 106, and a flow chamber 103. The flow chamber 103 fluidly couples the inlet port 102 to the outlet port 106 and, when the check valve assembly 100 is in an open position shown in FIG. 2, routes the operating fluid 130 from the inlet port 102 to the outlet port 106 (e.g., in the direction indicated by the arrow A in FIG. 2). In some embodiments, the operating fluid 130 can be a liquid or gaseous fuel, while in other embodiments, the operating fluid 130 can be water and/or any other liquid, gas, or mixture thereof.

With continued reference to FIGS. 1-3, the housing 101, the inlet port 102, and/or the outlet port 106 can include/define threads 111 (identified individually as first threads 111a and second threads 111b respectively or other suitable mating features (e.g., grooves, slots, locking channels, etc.) for receiving and securing external components, such as fluid lines, pipes, etc.

Additionally or alternatively, the housing 101 can include/define a protrusion 104 that may be downstream of the first threads 111a and/or the inlet port 102. As shown in FIGS. 1-3, an inner cross-sectional dimension (e.g., diameter) of the protrusion 104 may be less than an inner cross-sectional dimension of the first threads 111a and/or an inner cross-sectional dimension of the inlet port 102. Additionally or alternatively, the housing 101 can include/define a stop portion 116 that may be downstream of the protrusion 104. As shown in FIGS. 1-3, an inner cross-sectional dimension of the stop portion 116 may be less than the inner cross-sectional dimension of the protrusion 104. As used herein, any cross-sectional dimension may be measured from an axis 132, centerline, or any other reference line of the check valve assembly 100.

The piston assembly 120 can include a poppet 122, a flange 126, and a shaft 124 extending between and coupling the poppet 122 and the flange 126. The poppet 122 can be movably positioned within the flow chamber 103. The poppet 122 may be positioned at least partially between the protrusion 104 and the stop portion 116. In some cases, the poppet 122 may be of any shape and can include an outer cross-sectional dimension, or outer width, that is greater than the inner cross-sectional dimension of the protrusion 104 and/or an inner cross-sectional dimension of the stop portion 116. In such instances, as shown in FIG. 1, the poppet 122 may abut the protrusion 104 and/or a first sealing member 107 to define a closed position and/or, as shown in FIG. 2, the poppet 122 of the piston assembly 120 can abut/engage the stop portion 116 in the open position to inhibit or even prevent further compression of the biasing member 105.

In various examples, the first sealing member 107 may be operably coupled with the protrusion 104, and/or any other portion of the housing 101. The first sealing member 107 can be an O-ring, machined seal, and/or another suitable element.

As illustrated in FIGS. 1-3, the shaft 124 may be operably coupled with a downstream portion of the poppet 122. In some cases, the shaft 124 may extend at least partially through the flow chamber 103 and, in some embodiments, can extend into a forward actuation chamber 112 defined by the housing 101, and at least partially into a rearward actuation chamber 113 defined by the housing 101. In various examples, the shaft 124 may have an outer cross-sectional dimension that is less than the inner cross-sectional dimension of the stop portion 116 and/or the inner cross-sectional dimension of the protrusion 104.

The flange 126 can be movably positioned within the forward actuation chamber 112 and the rearward actuation chamber 113 and can have a cross-sectional dimension that is greater than a corresponding cross-sectional dimension of the shaft 124. In various examples, the flange 126 may have an outer cross-sectional dimension that is greater than the outer cross-sectional dimension of the poppet 122. Additionally or alternatively, the outer cross-sectional dimension of the flange 126 may be greater than the inner cross-sectional dimension of the stop portion 116 and/or the inner cross-sectional dimension of the protrusion 104. In some embodiments, the poppet 122, the shaft 124, and/or the flange 126 can be integrally formed with one another. In other embodiments, the poppet 122, the shaft 124, and/or the flange 126 can be separate components that are permanently or releasably coupled with one another.

In the illustrated embodiments, the biasing member 105 is coupled between the flange 126 and the housing 101 and can be configured to bias the piston assembly 120 toward the first sealing member 107 of the housing 101 (e.g., in the direction indicated by the arrow B in FIG. 1). The biasing member 105 can be or include a spring, such as a compression spring. In the illustrated embodiments, the shaft 124 is at least partially within the biasing member 105 (e.g.; within a channel/lumen of the biasing member 105). That is, the biasing member 105 can be at least partially coupled to the shaft 124.

In the illustrated embodiments, a second sealing member 108 can be positioned between the shaft 124 of the piston assembly 120 and the housing 101 (e.g., along the stop portion 116). In various instances, the second sealing member 108 may be configured to seal (e.g., fluidly separate) the flow chamber 103 from the forward actuation chamber 112. Accordingly, the second sealing member 108 can inhibit or even prevent the operating fluid 130 from flowing between the flow chamber 103 and the forward actuation chamber 112. Similarly, a third sealing member 109 can be positioned between the flange 126 of the piston assembly 120 and the housing 101. The third sealing member 109 may be configured to seal the forward actuation chamber 112 from the rearward actuation chamber 113. In some cases, the second sealing member 108 and the third sealing member 109 can be O-rings, machined seals, etc., and can be identical or different (e.g., having different sizes, materials, etc.). The second sealing member 108 can further be configured to remain in a fixed position relative to the housing 101 and maintain a fluid seal even as the shaft 124 moves (e.g., slides) thereby/therethrough. The third sealing member 109 can further be configured to remain in a fixed position relative to the actuation flange 126 and maintain a fluid seal even as the piston assembly 120 moves. Accordingly, during normal operation of the check valve assembly 100, the rearward actuation chamber 113 can operate with a pressure different than the forward actuation chamber 112 to aid the piston assembly in opening and closing.

Referring back to FIG. 1, when the check valve assembly 100 is in the closed position, the biasing member 105 biases the piston assembly 120 toward the first sealing member 107 of the housing 101 and the inlet port 102 such that the poppet 122 sealingly engages the first sealing member 107 to inhibit or even prevent the operating fluid 130 from flowing into the flow chamber 103. Accordingly, the piston assembly 120 fluidly separates the inlet port 102 from the outlet port 106 in the closed position.

Referring to FIG. 2, when the force/pressure of the operating fluid 130 at the inlet port 102 exceeds a predetermined cracking pressure/force (e.g., a "cracking pressure") or threshold cracking value, the operating fluid 130 forces the piston assembly 120 to move counter to the biasing force of the biasing member 105 (e.g., in the direction indicated by arrow C in FIG. 2) such that the poppet 122 disengages the first sealing member 107 of the housing 101 to permit the operating fluid 130 to flow through the flow chamber 103 from the inlet port 102 to the outlet port 106. Accordingly, the piston assembly 120 may disengage the first sealing member 107 in the open position, and the inlet port 102 is fluidly connected to the outlet port 106. In the illustrated embodiments, the operating fluid 130 flows through an annular space in the flow chamber 103 between the housing 101 and an outer surface of the poppet 122. In other embodiments, the poppet 122 can be configured differently to change the flow paths of the operating fluid 130. For example, the poppet 122 can be sized to generally match a dimension (e.g., circumference) of the flow chamber 103 to inhibit flow around the poppet 122 between the poppet 122 and the housing 101 and permit flow via a flow path through the poppet 122 itself. In other embodiments, the poppet 122 and flow chamber 103 can be configured to permit the flow of the operating fluid through both the poppet 122 and through the flow chamber 103. In some embodiments, the biasing member 105 can be selected to provide a predetermined cracking pressure. For example, a spring constant of the biasing member 105 can be selected/tuned to provide a higher or lower cracking pressure.

Referring to FIG. 2, if the force/pressure of the operating fluid 130 exceeds a predetermined stop force/pressure or threshold stop value, the operating fluid 130 can drive the poppet 122 of the piston assembly 120 into engagement with the stop portion 116 of the housing 101 to inhibit further compression of the biasing member 105. Accordingly, in the open position, the stop portion 116 may prevent the poppet 122 from moving farther from the first sealing member 107 in the direction indicated by the arrow C in FIG. 2. In the illustrated embodiments, the poppet 122 abuts the stop portion 116 before the biasing member 105 is fully compressed (e.g., reaches a solid-height position in which all adjacent coils of the biasing member 105 contact one another). In various aspects of the present technology, the stop portion 116 can inhibit excessive compression of the biasing member 105 that could damage the biasing member 105.

As illustrated in FIGS. 1-3, the housing may further include/define an inlet channel 110 and/or an outlet channel 115. In some cases, the inlet channel 110 may fluidly couple the inlet port 102 with the forward actuation chamber 112. Additionally or alternatively, the outlet channel 115 may fluidly couple the outlet port 106 with the rearward actuation chamber 113. As shown in FIG. 2, the operating fluid 130, having a first pressure at the inlet port 102, may be routed to the forward actuation chamber 112 through the inlet channel 110. Furthermore, the operating fluid 130, having the first pressure (or a varied second pressure) at the outlet port 106, can be routed to the rearward actuation chamber 113 through the outlet channel 115. When the check valve assembly 100 is in the open position, as shown in FIG. 2, fluid flow of the operating fluid 130 through the internal flow impediment 117 results in reduced pressure of the operating fluid 130 downstream of the internal flow impediment 117. As shown in FIG. 2, flow in the direction from the inlet port 102 to the outlet port 106 results in higher pressure in the forward actuation chamber 112 compared to the rearward actuation chamber 113, which results in an increased net force on the flange 126 in opposition of the biasing member 105. In the illustrated embodiments, this increase in net force may assist in maintaining the check valve assembly 100 in the open position when the pressure of the operating fluid 130 is less than the cracking pressure of a conventional check valve.

In various aspects of the present technology, pressurized backflow results in higher pressure of the operating fluid 130 at the outlet port 106 compared to the inlet port 102. Higher pressure at the outlet port 106 results in a net force that compliments the force of the biasing member 105, aiding the piston assembly 120 to return the valve to the closed position (e.g., in the direction indicated by the arrows D in FIG. 3).

In various aspects of the present technology, the check valve assembly 100 can reduce movement of the piston assembly 120 even when the pressure of the operating fluid 130 at the inlet port 102 rapidly oscillates/fluctuates. This can inhibit or even prevent the check valve assembly 100 from rapidly opening and closing ("chattering"), thereby reducing the wear on the housing 101, the poppet 122, and/or other components of the check valve assembly 100. In contrast, conventional check valves are susceptible to chatter when the inlet pressure rapidly fluctuates. Furthermore, the increase in net force in the illustrated embodiment assists to maintain an open check valve assembly 100 at pressures which may result in the partial opening or closing of conventional valves.

Figure 4:
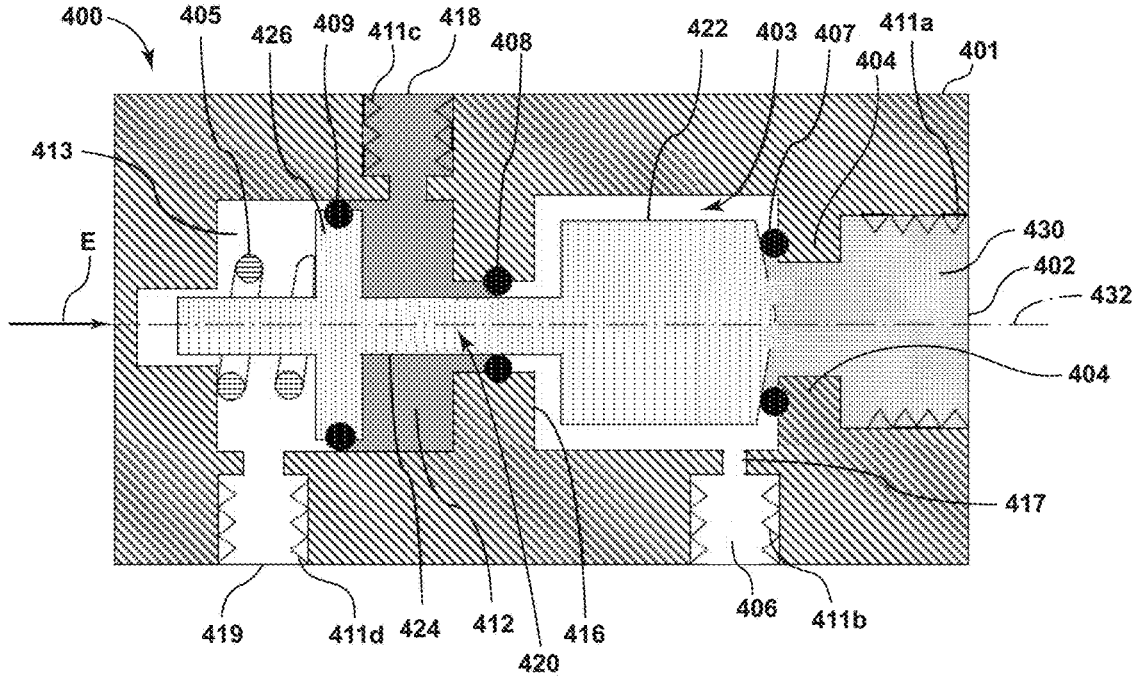
FIG. 4 illustrates a side cross-sectional view of a representative check valve assembly in a closed position in accordance with embodiments of the present technology.
Figure 5:
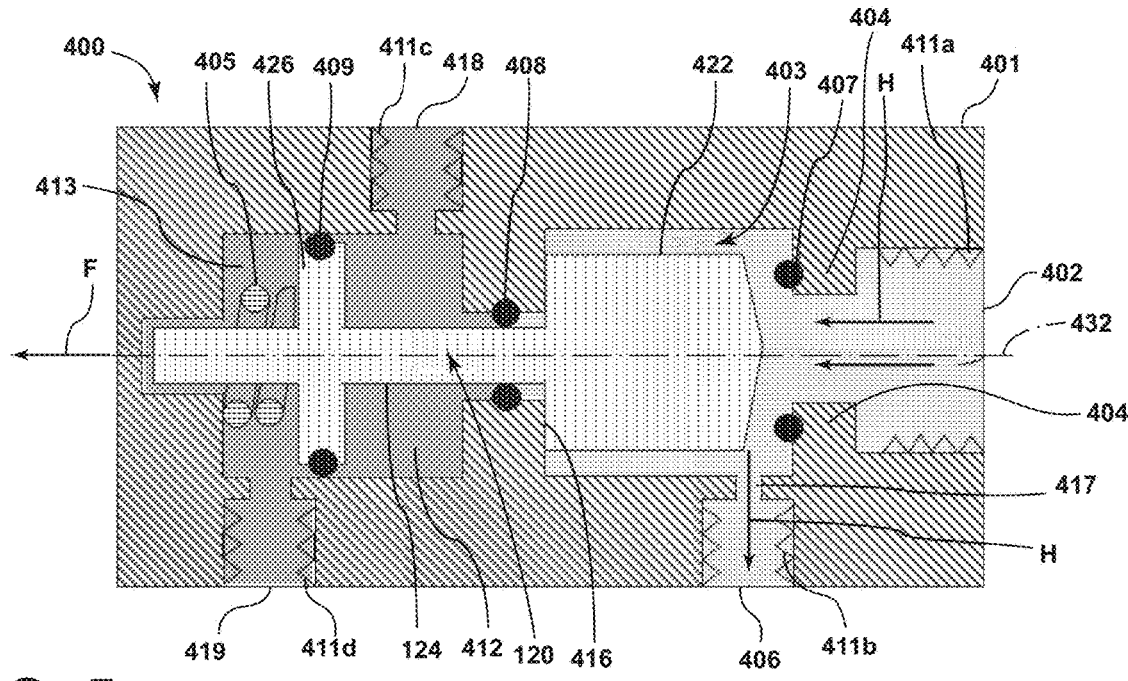
FIG. 5 illustrates a side cross-sectional view of the check valve assembly of FIG. 4 in an open position in accordance with embodiments of the present technology.
Figure 6:
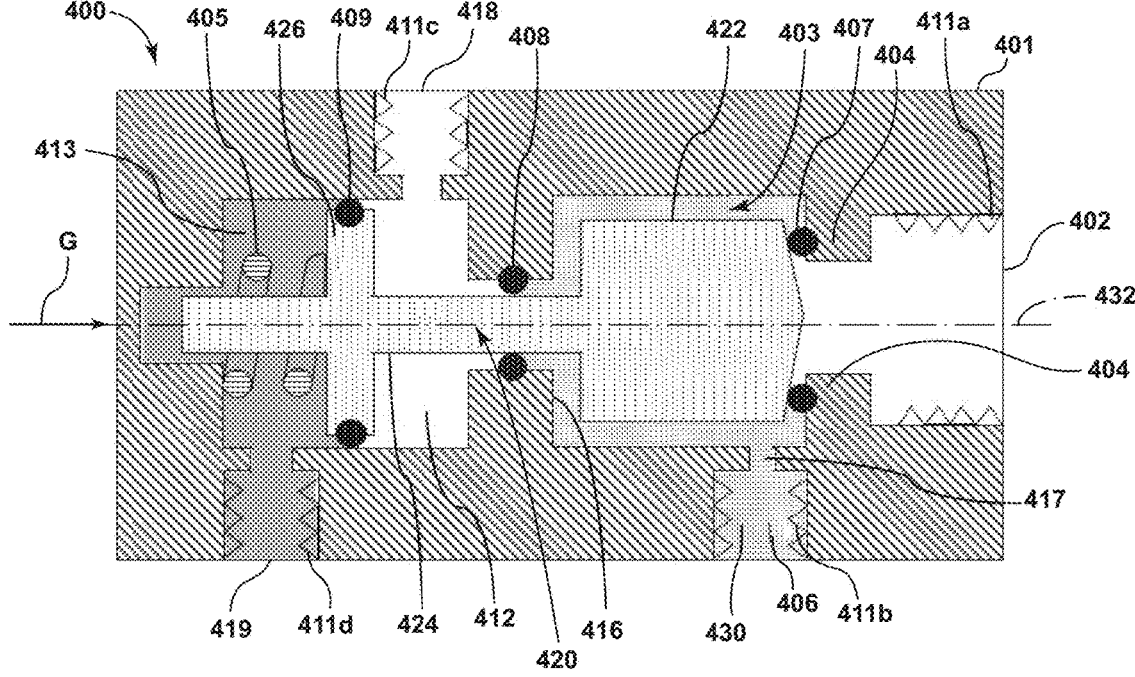
FIG. 6 illustrates a side cross-sectional view of the check valve assembly of FIG. 4 during pressurized backflow in accordance with embodiments of the present technology.

FIGS. 4-6 are side cross-sectional views of a check valve assembly 400 configured in accordance with embodiments of the present technology. The check valve assembly 400 is in a closed position/configuration in FIG. 4, an open position/configuration in FIG. 5, and a configuration in which the check valve is sealed against a pressurized backflow in the closed position/configuration in FIG. 6.

Referring to FIGS. 4-6 together, the check valve assembly 400 can include several features generally similar or identical to the features of the check valve assembly 100 described in detail above with reference to FIGS. 1-3. In the illustrated embodiments, for example, the check valve assembly 400 includes a housing 401, a piston assembly 420 movably positioned within the housing 401, and a biasing member 405 operably coupled between the piston assembly 420 and the housing 401. Likewise, the housing 401 defines and/or includes an inlet port 402 configured to receive a flow of the operating fluid 130, an outlet port 406, and a flow chamber 403. The flow chamber 403 fluidly couples the inlet port 402 to the outlet port 406 and, when the check valve assembly 400 is in the open position shown in FIG. 5, routes the operating fluid 130 from the inlet port 402 to the outlet port 406 (e.g., in the direction indicated by the arrows H in FIG. 5).

As provided herein, the housing 401, the inlet port 402, and/or the outlet port 406 can include/define threads 411 (identified individually as first threads 411a and second threads 411b respectively or other suitable mating features (e.g., grooves, slots, locking channels, etc.) for receiving and securing external components, such as fluid lines, pipes, etc.

Additionally or alternatively, the housing 401 can include/define a protrusion 404 that may be downstream of the first threads 411a and/or the inlet port 402. As shown in FIGS. 4-6, an inner cross-sectional dimension of the protrusion 404 may be less than an inner cross-sectional dimension of the first threads 411a and/or an inner cross-sectional dimension of the inlet port 402. Additionally or alternatively, the housing 401 can include/define a stop portion 416 that may be downstream of the protrusion 404. As shown in FIGS. 4-6, an inner cross-sectional dimension of the stop portion 416 may be less than the inner cross-sectional dimension of the protrusion 404. As used herein, any cross-sectional dimension may be measured from an axis 432, centerline, or any other reference line of the check valve assembly 100.

The piston assembly 420 can include a poppet 422, a flange 426, and a shaft 424 extending between and coupling the poppet 422 and the flange 426. The poppet 422 can be movably positioned within the flow chamber 403. The poppet 422 may be positioned at least partially between the protrusion 404 and the stop portion 416. In some cases, the poppet 422 may be of any shape and can include an outer cross-sectional dimension, or outer width, that is greater than the inner cross-sectional dimension of the protrusion 404 and/or an inner cross-sectional dimension of the stop portion 416. In such instances, as shown in FIG. 4, the poppet 122 may abut the protrusion 404 and/or a first sealing member 407 to define a closed position and/or, as shown in FIG. 5, the poppet 422 of the piston assembly 120 can abut/engage the stop portion 416 in the open position to inhibit or even prevent further compression of the biasing member 405.

As shown in FIGS. 4-6, the housing 401 may include a first sealing member 407. The first sealing member 407 can be an O-ring, machined seal, and/or another suitable element. In various examples, the first sealing member 407 may be operably coupled with the protrusion 404, and/or any other portion of the housing 401.

As illustrated in FIGS. 4-6, the shaft 424 may be operably coupled with a downstream portion of the poppet 422. In some cases, the shaft 424 may extend at least partially through the flow chamber 403 and, in some embodiments, can extend into a forward actuation chamber 412 defined by the housing 401 and at least partially into a rearward actuation chamber 413 defined by the housing 401. In various examples, the shaft 424 may have an outer cross-sectional dimension that is less than the inner cross-sectional dimension of the stop portion 416 and/or the inner cross-sectional dimension of the protrusion 404.

The flange 426 can be movably positioned within the forward actuation chamber 412 and the rearward actuation chamber 413 and can have a cross-sectional dimension (e.g., diameter) that is greater than a corresponding cross-sectional dimension of the shaft 424. The shaft 424 extends at least partially through the flow chamber 403 and, in some embodiments, can extend into the forward actuation chamber 412 and at least partially into the rearward actuation chamber 413. In some embodiments, the poppet 422, the shaft 424, and/or the flange 426 can be integrally formed together while, in other embodiments, the poppet 422, the shaft 424, and/or the flange 426 can be separate components that are permanently or releasably coupled with one another.

In the illustrated embodiments, the housing 401 further defines/includes a forward actuation port 418 and a rearward actuation port 419. The forward actuation port 418 is positioned to route pressure to and from the forward actuation chamber 412. The rearward actuation port 419 is positioned to route pressure to and from the rearward actuation chamber 413. In the illustrated embodiments, the forward actuation chamber 412 and the rearward actuation chamber 413 may be operated with an actuation fluid 435. In another aspect of the present embodiments, this configuration advantageously allows the actuation fluid 435 to be selected regardless of the operating fluid 430. The actuation fluid 435 may be the same as the actuation fluid 435, or some other fluid such as a hydraulic fluid, oil or lubricant, or another suitable fluid.

In the illustrated embodiments, the biasing member 405 is positioned between the flange 426 and the housing 401 and is configured to bias the piston assembly 420 toward the first scaling member 407 of the housing 401 (e.g., in the direction indicated by the arrow E in FIG. 4). Referring to FIG. 4, when the check valve assembly 400 is in the closed position, the biasing member 405 biases the piston assembly 420 toward the first sealing member 407 of the housing 401 and the inlet port 402 such that the poppet 422 sealingly engages the first sealing member 407 to inhibit or even prevent the operating fluid 430 from flowing into the flow chamber 403. Accordingly, the piston assembly 420 fluidly separates the inlet port 402 from the outlet port 406 in the closed position.

In the illustrated embodiments, a second sealing member 408 may be positioned between the shaft 424 of the piston assembly 420 and the housing 401. The second scaling member 408 may be configured to seal (e.g., fluidly separate) the flow chamber 403 from the forward actuation chamber 412. Accordingly, the second scaling member 408 can inhibit or even prevent the operating fluid 430 from flowing between the flow chamber 403 and the forward actuation chamber 412. In implementations that utilize an actuation fluid, the second sealing member 408 can inhibit or even prevent the actuation fluid 435 from flowing from the forward actuation chamber 412 to the flow chamber 403. Similarly, a third sealing member 409 may be positioned between the flange 426 of the piston assembly 420 and the housing 401. The third scaling member 409 may be configured to seal the forward actuation chamber 412 from the rearward actuation chamber 413. The second scaling member 408 and the third scaling member 409 can be O-rings, machined seals, etc., and can be identical or different (e.g., having different sizes, materials, etc.). The second sealing member 408 can further be configured to remain in a fixed position relative to the housing 401 and/or the piston assembly to maintain a fluid seal even as the shaft 424 moves (e.g., slides) thereby/therethrough. The third sealing member 409 can further be configured to remain in a fixed position relative to the actuation flange 426 and maintain a fluid seal even as the shaft 424 moves relative to the housing 401. Accordingly, during normal operation of the check valve assembly 400, the rearward actuation chamber 413 and forward actuation chamber 412 may operate with different pressures to aid the piston assembly in opening and closing the valve assembly 400.

Referring to FIG. 4, when the check valve assembly 400 is in the closed position, the biasing member 405 biases the piston assembly 420 toward the first sealing member 407 of the housing 401 and the inlet port 402 such that the poppet 422 sealingly engages the first sealing member 407 to inhibit or even prevent the operating fluid 430 from flowing through the flow chamber 403. Accordingly, the piston assembly 420 fluidly separates the inlet port 402 from the outlet port 406 in the closed position.

Referring to FIG. 5, when the force and/or pressure of the operating fluid 430 at the inlet port 402 exceeds a predetermined cracking pressure/force (e.g., a "cracking pressure") or threshold cracking value, the operating fluid 430 forces the piston assembly 420 to move counter to the biasing force of the biasing member 405 (e.g., in the direction indicated by arrow F in FIG. 5) such that the poppet 422 disengages the first sealing member 407 of the housing 401 to permit the operating fluid 430 to flow through the flow chamber 403 from the inlet port 402 to the outlet port 406. Accordingly, the piston assembly 420 disengage the first sealing member 407 in the open position, and the inlet port 402 is fluidly connected to the outlet port 406. In the illustrated embodiments, the operating fluid 430 flows through an annular space in the flow chamber 403 between the housing 401 and an outer surface of the poppet 422. In other embodiments, the poppet 422 can be configured differently to change the flow paths of the operating fluid 430. For example, the poppet 422 can be sized to generally match a dimension (e.g., circumference) of the flow chamber 403 to inhibit flow around the poppet 422 between the poppet 422 and the housing 401 and permit flow via a flow path through the poppet 422 itself. In other embodiments, the poppet 422 and the flow chamber 403 can be configured to permit the flow of the operating fluid through both the poppet 422 and the flow chamber 403. In some embodiments, the biasing member 405 can be selected to provide a predetermined cracking pressure. For example, a spring constant of the biasing member 405 can be selected/tuned to provide a higher or lower cracking pressure.

In another aspect of the present technology, the piston assembly 420 may be operated to open the valve when the force and/or pressure of the actuation fluid 435 at the forward actuation port 418 exceeds predetermined cracking pressure/force (e.g., a "cracking pressure") or threshold cracking value of the check valve assembly 400. The actuation fluid 435 forces the piston assembly 420 to move counter to the biasing force of the biasing member 405 such that the poppet 422 disengages the first sealing member 407 of the housing 401 to permit the operating fluid 430 to flow through the flow chamber 403 from the inlet port 402 to the outlet port 406.

In various aspects of the present technology, pressurized backflow may result in higher pressure of the operating fluid 130 at the outlet port 406 compared to the inlet port 402. Higher pressure at the outlet port 406 will result in a net force that compliments the force of the biasing member, aiding the piston assembly 420 to return the valve to the closed position as shown in FIG. 6.

In another aspect of the present technology, the piston assembly 420 may be operated to close the valve when the force and/or pressure of the actuation fluid 435 at the rearward actuation port 419 coupled with the force of the biasing member 405 exceeds the coupled force of the forward actuation chamber 412 and pressure of the inlet port 402. This closing net force forces the piston assembly 420 to move in the direction of the biasing force of the biasing member 405 (e.g., in the direction indicated by arrow G in FIG. 6) such that the poppet 422 engages the first sealing member 407 of the housing 401 to inhibit or even prevent the operating fluid 430 from flowing through the flow chamber 403 between the inlet port 402 and the outlet port 406.

In another aspect of the present technology, an internal flow impediment 417 may be used to increase the difference in pressure between the inlet port 402 and the outlet port 406 during fluid flow. By routing the inlet pressure from the inlet port 402 to the forward actuation port 418 and by routing the outlet pressure from the outlet port 406 to the rearward actuation port 419, the forward flow may aid in opening the check valve assembly 400 and pressurized backflow may aid to the close the check valve assembly 400.

In another aspect of the present technology, an external flow impediment may be used to create a difference in pressure upstream and downstream of the external flow impediment during the fluid flow of the operating fluid 430. By routing the pressure upstream of the external flow impediment to the forward actuation port 418 and by routing the pressure downstream of the external flow impediment to the rearward actuation port 419, the forward flow may aid in opening the valve and pressurized backflow may aid to close the valve. In other embodiments, the forward actuation port 418 and the rearward actuation port 419 may be coupled to external fluid control devices to provide control of the piston assembly 420.

In another aspect of the present technology, the check valve assembly 400 can reduce movement of the piston assembly 420 even when the pressure of the operating fluid 430 at the inlet port 402 rapidly oscillates/fluctuates. This can inhibit or even prevent the check valve assembly 400 from rapidly opening and closing ("chattering"), thereby reducing the wear on the housing 401, the poppet 422, and/or other internal components of the check valve assembly 400. In contrast, conventional check valves are susceptible to chatter when the inlet pressure rapidly fluctuates. Furthermore, the increase in net force in the illustrated embodiment assists to maintain an open check valve assembly 400 at pressures that may result in the partial opening or closing of conventional valves.

In several aspects of the present technology, the check valve assembly 400 can reduce movement of the piston assembly 420 even when the pressure of the operating fluid 130 at the inlet port 402 rapidly oscillates/fluctuates. This can inhibit or even prevent the check valve assembly 400 from rapidly opening and closing ("chattering"), thereby reducing the wear on the housing 401, the poppet 422, and/or other internal components of the check valve assembly 400. In contrast, conventional check valves are susceptible to chatter when the inlet pressure rapidly fluctuates.

Figure 7:
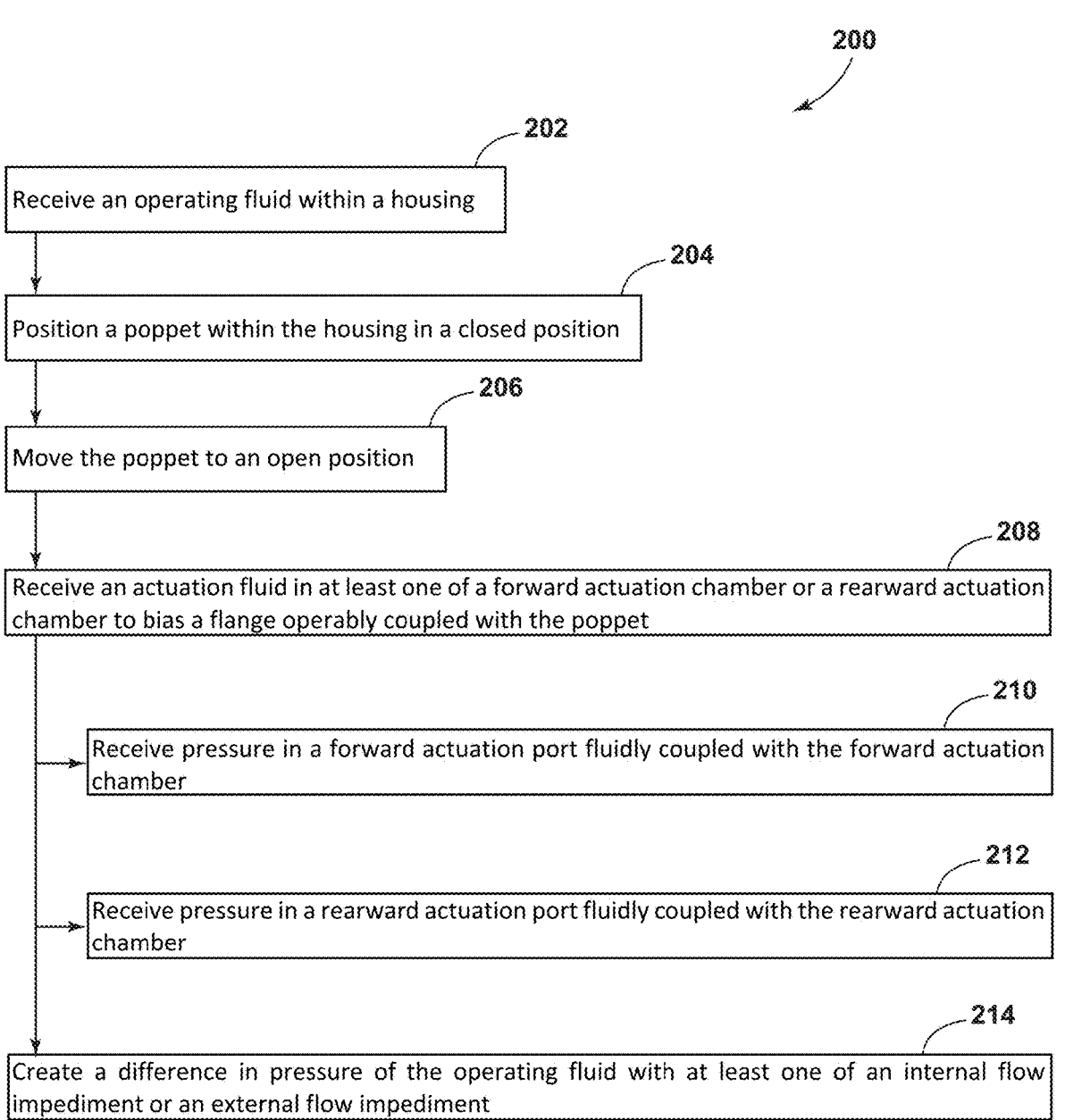
FIG. 7 is a flow diagram of a method for the operation of the check valve assembly in accordance with embodiments of the present technology.

Referring now to FIG. 7, a flow diagram of some embodiments of a method for operating a check valve assembly is illustrated in accordance with aspects of the present subject matter. In general, the method 200 will be described herein with reference to the check valve assembly described above with reference to FIGS. 1-6. However, the method 200 may generally be utilized with any suitable valve assembly and/or may be utilized in connection with a system having any other suitable configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein may be omitted, rearranged, combined, and/or adapted in various ways without deviating from the scope of the present disclosure.

As illustrated in FIG. 7, at (202), the method 200 may include receiving an operating fluid within a housing. As provided herein, the housing may define an inlet port, an outlet port, a flow chamber fluidly coupling the inlet port to the outlet port.

At (204), the method 200 may include positioning a poppet within the housing in a closed position. As provided herein, the poppet is positioned in the flow chamber. A flange may be positioned in an actuation chamber. A shaft may extend between and couple the poppet and the flange. In some cases, the poppet seals the flow chamber to fluidly separate the inlet port from the outlet port in the closed position.

At (206), the method 200 may include moving the poppet to an open position. As provided herein, the operating fluid flows through the flow chamber from the inlet port to the outlet port in the open position.

At (208), the method 200 may include receiving an actuation fluid in at least one of a forward actuation chamber or a rearward actuation chamber to bias a flange operably coupled with the poppet. In some instances, at (210), receiving an actuation fluid in at least one of a forward actuation chamber or a rearward actuation chamber can further include receiving pressure in a forward actuation port fluidly coupled with the forward actuation chamber to aid the poppet to the open position. Alternatively, at (212), receiving an actuation fluid in at least one of a forward actuation chamber or a rearward actuation chamber can further include receiving pressure in a rearward actuation port fluidly coupled with the rearward actuation chamber to aid the poppet to the closed position.

At (214), the method 200 may include creating a difference in pressure of the operating fluid with at least one of an internal flow impediment or an external flow impediment due to flow through at least one of the internal flow impediment or the external flow impediment.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A check valve assembly, comprising:
a housing defining an inlet port, an outlet port, a flow chamber fluidly coupling the inlet port to the outlet port, and an actuation chamber, the actuation chamber defining a forward actuation chamber and a rearward actuation chamber, wherein an outlet channel fluidly couples the outlet port with the rearward actuation chamber;
a piston assembly movable between a closed position and an open position, the piston assembly comprising:
a poppet positioned in the flow chamber and configured to sealingly engage the housing in the closed position to fluidly separate the inlet port from the outlet port;
a flange positioned in the actuation chamber; and
a shaft extending between the poppet and the flange;
a sealing member positioned between the flange and the housing to fluidly separate the forward actuation chamber defined by the housing and the flange from the rearward actuation chamber defined by the housing and the flange; and
a biasing member operably coupled to the piston assembly, wherein the biasing member is configured to bias the piston assembly to the closed position.

2. The check valve assembly of claim 1, wherein the inlet port is configured to receive a flow of an operating fluid.

3. The check valve assembly of claim 2, wherein the piston assembly is configured to move from the closed position to the open position when a pressure of the operating fluid at the inlet port or the forward actuation chamber exceeds a threshold cracking value.

4. The check valve assembly of claim 2, wherein the housing further defines an inlet channel fluidly coupling the inlet port to the forward actuation chamber.

5. The check valve assembly of claim 4, wherein the inlet channel is configured to pass the operating fluid of a defined pressure from the inlet port to the forward actuation chamber.

6. The check valve assembly of claim 5, wherein the outlet channel is configured to pass the operating fluid of the defined pressure from the outlet port to the rearward actuation chamber.

7. The check valve assembly of claim 2, wherein the housing includes a flow impediment to reduce a pressure of the operating fluid in a direction of the flow between the inlet port and the outlet port.

8. The check valve assembly of claim 1, further comprising:
a first sealing member between the poppet and the housing, the first sealing member configured to fluidly separate a flow of an operating fluid from the inlet port to the outlet port.

9. The check valve assembly of claim 8, further comprising:
a second sealing member between the shaft and the housing configured to fluidly separate the flow chamber from the actuation chamber.

10. The check valve assembly of claim 1, further comprising:
a third sealing member positioned between the flange and the housing to fluidly separate the forward actuation chamber and the rearward actuation chamber.

11. A check valve assembly, comprising:
a housing defining an inlet port configured to receive a flow of an operating fluid, an outlet port, a flow chamber fluidly coupling the inlet port to the outlet port, a forward actuation chamber and a rearward actuation chamber each separated from the flow chamber, an inlet channel fluidly coupling the inlet port to the forward actuation chamber configured to pass the operating fluid of a defined pressure from the inlet port to the forward actuation chamber, and an outlet channel fluidly coupling the outlet port the rearward actuation chamber;
a piston assembly movable between a closed position and an open position;
a sealing member positioned between the piston assembly and the housing to fluidly separate the forward actuation chamber defined by the housing and the piston assembly from the rearward actuation chamber and the piston assembly; and
a biasing member operably coupled to the piston assembly, wherein the biasing member is configured to bias the piston assembly to the closed position.

12. The check valve assembly of claim 11, wherein the piston assembly further comprises:
a poppet positioned in the flow chamber and configured to sealingly engage the housing in the closed position to fluidly separate the inlet port from the outlet port;
a flange positioned between the forward actuation chamber and the rearward actuation chamber; and
a shaft extending between the poppet and the flange.

13. The check valve assembly of claim 12, wherein the piston assembly is configured to move from the closed position to the open position when a pressure of the operating fluid at the inlet port or the forward actuation chamber exceeds a threshold cracking value.

14. The check valve assembly of claim 12, further comprising:
a first sealing member between the poppet and the housing, the first sealing member configured to fluidly separate the flow of the operating fluid from the inlet port to the outlet port.

15. A check valve assembly, comprising:
a housing defining an inlet port configured to receive a flow of an operating fluid, an outlet port, a flow chamber fluidly coupling the inlet port to the outlet port, a forward actuation chamber and a rearward actuation chamber each separated from the flow chamber, an inlet channel fluidly coupling the inlet port to the forward actuation chamber configured to pass the operating fluid of a defined pressure from the inlet port to the forward actuation chamber, and an outlet channel fluidly coupling the outlet port the rearward actuation chamber;
a piston assembly movable between a closed position and an open position, wherein the piston assembly is movable between a closed position that is configured to fluidly separate the inlet port from the outlet port and an open position that is configured to permit an operating fluid to flow through the flow chamber from the inlet port to the outlet port; and
a biasing member operably coupled to the piston assembly, wherein the biasing member is configured to bias the piston assembly to the closed position.

16. The check valve assembly of claim 15, wherein the piston assembly includes a poppet within the flow chamber, a flange positioned in the actuation chamber, and a shaft extending between the poppet and the flange, the shaft extending into the flow chamber and the actuation chamber along a common axis.

17. The check valve assembly of claim 16, further comprising:
a flow impediment configured to reduce a pressure of the operating fluid in a direction of the flow between the inlet port and the outlet port.

18. The check valve assembly of claim 16, further comprising:
a first sealing member between the poppet and the housing, the first sealing member configured to fluidly separate the flow of the operating fluid from the inlet port to the outlet port; and
a second sealing member positioned to inhibit a flow of the operating fluid between the flow chamber and the actuation chamber and the forward actuation chamber.

19. The check valve assembly of claim 18, further comprising:
a third sealing member positioned to inhibit the flow of the operating fluid between the forward actuation chamber and the rearward actuation chamber.

20. The check valve assembly of claim 16, wherein the flange is positioned between a forward actuation chamber and a rearward actuation chamber, and wherein a pressure from the inlet channel aids in moving the poppet to the open position and a pressure from the outlet channel aids in moving the poppet to the closed position.

21. The check valve assembly of claim 20, wherein the forward actuation chamber and the rearward actuation chamber are operated with an actuation fluid.

* * * * *